Figure 1:
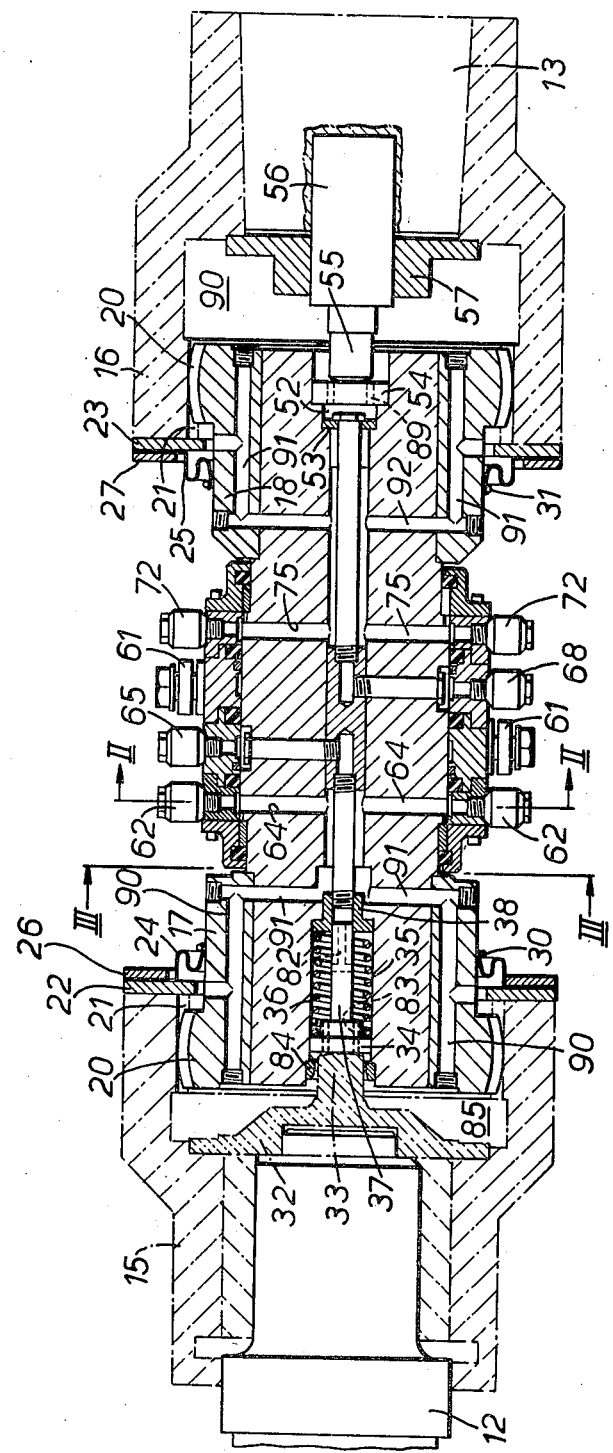

United States Patent [19]

Barber

[11] 4,176,540

[45] Dec. 4, 1979

[54] SPLINED ARTICULATED COUPLING

[75] Inventor: Bernard H. Barber, Sheffield, England

[73] Assignee: Davy-Loewy Limited, Yorkshire, England

[21] Appl. No.: 887,406

[22] Filed: Mar. 16, 1978

[30] Foreign Application Priority Data

Mar. 18, 1977 [GB] United Kingdom ............... 11614/77

[51] Int. Cl.² ............................................. B21B 27/08
[52] U.S. Cl. ......................................... 72/201; 72/236
[58] Field of Search .................. 72/41, 42, 43, 44, 45, 72/200, 201, 202, 236

[56] References Cited

U.S. PATENT DOCUMENTS

| 3,411,333 | 11/1968 | Frankel ........................ 72/45 |
| 4,061,010 | 12/1977 | Stock et al. ................... 72/201 |

FOREIGN PATENT DOCUMENTS

| 1948082 | 4/1971 | Fed. Rep. of Germany ............. 72/201 |
| 1382463 | 1/1964 | France ........................ 72/236 |
| 51-79663 | 7/1976 | Japan ......................... 72/201 |
| 1263898 | 2/1972 | United Kingdom ................ 72/236 |

Primary Examiner—Ervin M. Combs
Attorney, Agent, or Firm—Daniel Patch

[57] ABSTRACT

An articulated spindle as used for example in a rolling mill drive has a shank the ends of which are connected to sleeves through gear-type couplings. Liquid is continually passed through each gear-type coupling for cooling and lubrication. The liquid is supplied under pressure through the shank to the couplings, passes through the couplings, and is withdrawn under suction through return conduits which rotate with the shank. The liquid is supplied by a delivery pump through a rotating joint to the shank and is withdrawn from the return conduits through the rotating joint by a suction pump.

10 Claims, 4 Drawing Figures

SPLINED ARTICULATED COUPLING

This invention relates to articulated couplings, such as those employed in drive spindles for the driven rolls of rolling mills.

More particularly the invention relates to an articulated coupling comprising a shank, a sleeve surrounding one end of the shank and drive coupling means between the shank and the sleeve permitting limited variation in the inclination of the shank axis to the sleeve axis, and a supply system for supplying liquid (usually lubricant) to and through the shank and through the drive coupling means.

Such a coupling has been proposed in U.K. patent specification No. 1263898 in which the drive coupling means comprise gear teeth on the end of the shank meshing with internal gear teeth on the sleeve. In the proposal of that specification, oil is supplied under pressure continuously to and through the shank to the gear teeth. After passing between the gear teeth, the oil drains into a stationary casing which surrounds the shank end and from which it discharges by gravity and by virtue of the pressure within the casing to a cooler before being recirculated by a pump. A complicated rotary seal was required between the stationary casing and the rotating shank; the seal disclosed in the specification is of the labyrinth type. Because of the pressure within the casing, there is the danger that oil may find its way through the seal.

An object of the invention is to enable a simple seal to be employed at the coupling without substantial danger of leakage.

The present invention resides in an articulated coupling as specified above, in which there are means for withdrawing under suction liquid which has passed through the drive coupling means, through a conduit arranged to rotate with the shank. While it is preferred that the drive coupling means be of the gear-type, other forms may be employed such as a ball-coupling.

Because the liquid is withdrawn through a conduit which rotates with the shank, the need for a stationary casing no longer obtains and a rotary seal is avoided. Further, because the liquid is withdrawn under suction, the pressure within the coupling at the discharge side of the drive coupling means is below atmospheric pressure and a simple form of seal can be used.

It is perferred that the liquid passing to, and being removed from, the drive coupling means should travel through passages in the shank, supply and delivery pipes being connected to the passages through rotary joints spaced from the drive coupling means.

Couplings according to the invention may be utilised in pinion drives for rolling mills, when the shank carries a sleeve at each end connected to the shank through the drive coupling means. The resulting articulated spindles may be used in both horizontal and vertical mills, transmitting drive from a pinion box to the driven rolls of the mill.

Figure 1A:
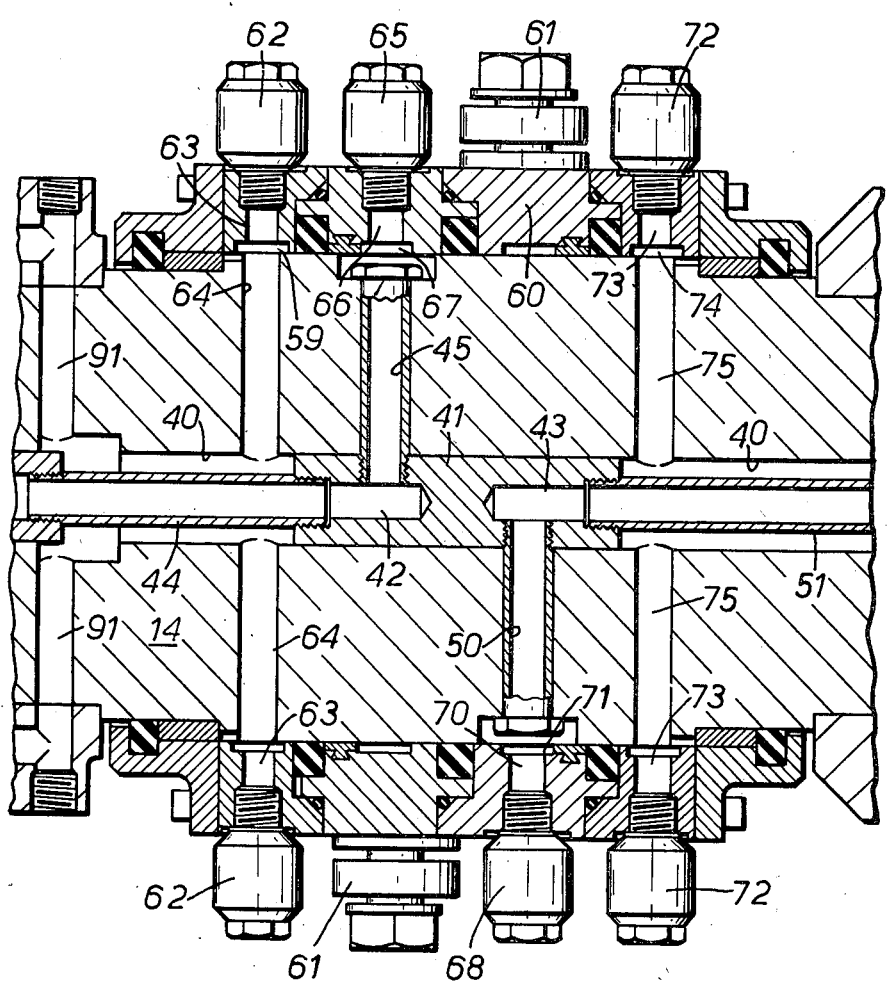
Figure 2:
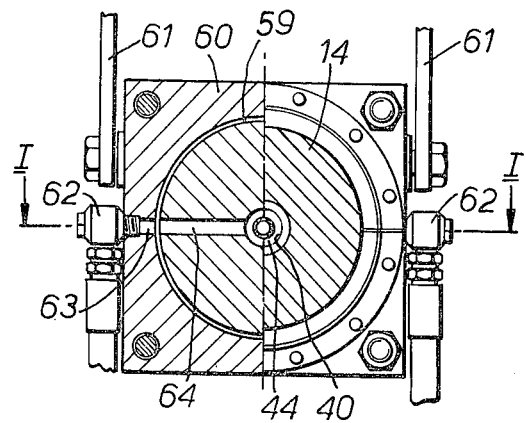
Figure 3:
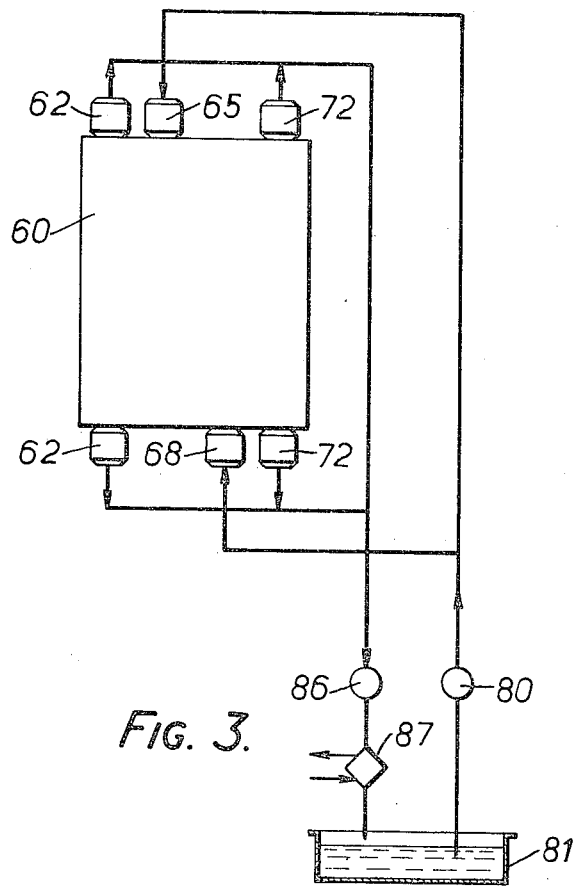

The invention will be more readily understood by way of example from the following description of articulated couplings in accordance therewith, reference being made to the accompanying drawings, in which FIG. 1 is an axial section through a drive spindle, and is a section on the line I—I of FIG. 2, FIG. 1a shows on enlarged scale the rotary joint of FIG. 1, FIG. 2 is a radial section through the drive spindle, the left hand half of the Figure being a section on the line II—II, and the right hand half being a section on the line III—III of FIG. 1, and FIG. 3 schematically shows the flow of oil to and from the spindle coupling.

The drive spindle shown in the drawings is intended for a rolling mill drive, to couple one of the two driven rolls of he mill to one of the two output shafts of a pinion box. A second identical drive spindle connects the second output shaft of the pinion box with the other driven roll. In FIG. 1, the roll neck of the respective driven roll is indicated at 12, while the corresponding output shaft of the pinion box is indicated at 13.

The drive spindle comprises a shank 14 which forms with two coupling sleeves 15 and 16 two articulated couplings. The sleeves 15, 16 are secured on the ends of the roll neck 12 and the output shaft 13, respectively.

The sleeves 15, 16 are connected to the shank 14 by drive coupling means illustrated as comprising end sleeves 17 and 18, each of which has integral barrelled teeth 20 and meshing internal teeth 21 formed in the coupling sleeves 15 and 16. That arrangement allows limited angular displacement between the axes of the shank 14 and each of the coupling sleeves 15, 16.

Ring members 22 and 23 are secured on the ends of coupling sleeves 15 and 16, respectively, and simple flexible diaphragm ring-seals 24 and 25 are secured between members 22 and 23 and further rings 26 and 27, respectively. The seals 24 and 25 are held against the external faces of sleeves 17 and 18 by means of clips 30 and 31 respectively.

A cap 32 within the coupling sleeve 15 is bolted to that sleeve, so as to be coaxial with the roll neck 12; the cap 32 has an outwardly projecting integral stud 33 projecting into the shank 14 as shown and its end is engaged by the face of a piston 34 centrally arranged in a bore 35 of the shank 14. The piston 34 is biased against the stud 33 by a spring 36 and has a piston rod 37 the end of which is received in a liner 38.

The shank 14 has an axial passage 40, which is centrally closed by a plug 41 provided with blind bores 42 and 43. A tube 44 within passage 40 connects bore 42 with the central passage of liner 38, while a lined, radial passage 45 extends from bore 42 to the exterior of the shank 14.

At the pinion stand end of shank 14 the bore 43, which is connected with a lined radial passage 50, communicates with a tube 51 within the passage 40 and thence to an enlarged space 52 bounded by discs 53 and 54. Disc 54 is engaged by the protruding end 55 of a spring plunger 56 carried in the output shaft 13 and by a cap 57 which is bolted to the coupling sleeve 16.

A rotary joint for the supply and removal of oil to and from the articulated couplings is arranged between the coupling sleeves 15 and 16. The rotary joint is illustrated as consisting of a sleeve block 60 which circumscribes the shank 14 and which is held against rotation by means of links 61 (FIG. 2) pivotally attached to fixed columns (not shown). The sleeve block 60 carries six pipe couplings as follows: A pair of diametrically opposed couplings 62 connected with passages 63 through the block 60 to an annular slot 59 in the internal face of the block. Two radial passages 64 in the shank 14 open to the slot 63 at their outer ends, and to the bore 40 at the inner ends. Coupling 65 connects with a passage 66 through the block 60 to an annular slot 67, and thence to the radial passage 45. Coupling 68, which is similar to coupling 65, connects through passage 70 in the block 60, and thence via annular slot 71 to the passage 50. A pair of diametrically opposed couplings 72 connect through passages 73 in the block to annular slot 74, and thence through a pair of radial passages 75 in the shank 14 to the bore 40 at the pinion stand side of the plug 43.

In operation, oil is pumped by pump 80 (FIG. 3) from a reservoir 81 at low pressure to the couplings 65 and 68. The oil pumped to coupling 65 passes through the passage 45 to the bore 42 and thence via tube 44 and a passage 82 in the piston rod 37 to the bore 35. The oil then passes through axial passages 83 in the piston 34 and between the plug 33 and a restrictor ring 84 to a space 85 formed between the cap 32 and the end of the shank 14. Next, the oil flows between the teeth 20 and 21 lubricating and cooling the gear.

A suction pump 86 (FIG. 3) is connected to the couplings 62 and 72 and delivers through an oil cooler 87 to the reservoir 81. The oil passing between the teeth 20, 21 is thus withdrawn from the coupling via passages 90 in sleeve 17, radial passages 91 in the shank 14, the bore 40, the radial passage 64 and the passages 63 in the sleeve block 60.

Similarly, at the pinion box end of the shank, the oil delivered to coupling 68 passes via the passage 50, the tube 51, holes 89 in disc 54, the space 90, to the gear teeth. The oil is sucked by the suction pump 86 between the teeth 20, 21 of the pinion box coupling, passages 91 in the sleeve 18, passages 92 in the shank 14, the bore 40, the radial passage 75, and finally the passages 73 in the sleeve block 60.

Because the oil flowing between the teeth of the couplings is removed through the shank 14, the need for a stationary casing about each coupling is obviated and the omission of the casing removes the need for a rotary seal. At the same time, the removal of the oil under suction results in a low pressure existing at the discharge side of the gears and enables a simple form of oil-seal to be employed.

It will be appreciated that the length of the shank 14 may be substantially greater than that shown, relative to the other components of the drive spindle. Thus, although the bearing block 60 is illustrated as occupying almost the entire axial distance between the sleeves 15 and 16, in practice it will occupy only a proportion of that distance, being disposed approximately centrally of the shank.

What I claim is:
1. An articulated coupling comprising:
   (a) a rotatable shank;
   (b) a sleeve surrounding one end of said shank;
   (c) drive coupling means between said end of said shank and said sleeve permitting limited variation in the inclination of the axis of said shank relative to the axis of said sleeve;
   (d) a supply system for supplying liquid under pressure to and through said shank and to and through said drive coupling means;
   (e) a liquid return conduit leading from said drive coupling means through said shank to withdraw liquid delivered from said means, said return conduit constructed and arranged to rotate with said shank; and
   (f) means for withdrawing liquid through said conduit under suction.
2. An articulated coupling as claimed in claim 1, in which
   said liquid withdrawing means includes a suction pump connected through said return conduit to said drive coupling means.
3. An articulated coupling as claimed in claim 2, in which
   said conduit includes a withdrawal passage extending axially through said shank.
4. An articulated coupling as claimed in claim 3, comprising also
   a non-rotatable sleeve block carried by said shank;
   a plurality of liquid coupling means on said block connected to a supply pump and said suction pump,
   said sleeve block and said shank having connected passages therethrough connecting said coupling means to said drive coupling means.
5. An articulated coupling as claimed in claim 4, in which
   said coupling means connected to said supply pump communicates with an axial supply passage in said shank, leading to a space which is between said shank end and said sleeve and from which liquid can pass to said drive coupling means.
6. An articulated coupling as claimed in claim 1, in which
   said drive coupling means is a gear coupling comprising co-operating gear teeth on said shank and on said sleeve.
7. An articulated spindle comprising:
   (a) a rotatable shank;
   (b) a first sleeve and a second sleeve respectively surrounding a first end and a second end of said shank;
   (c) first drive coupling means between said first shank end and said first sleeve;
   (d) second drive coupling means between said second shank and said second sleeve;
   (e) each said drive coupling means permitting limited variation of the inclination of the axis of said shank and the axis of the respective coupling;
   (f) a supply system for supplying liquid under pressure to and through said shank and to and through each said drive coupling means;
   (g) a liquid return conduit for each said drive coupling means passing through said shank to withdraw liquid therefrom, each said return conduit constructed and arranged to rotate with said shank; and
   ((h) means for withdrawing liquid through said conduits under suction.
8. An articulated spindle as claimed in claim 7, further comprising:
   (a) a non-rotatable sleeve block carried by said shank between its ends;
   (b) a plurality of liquid coupling means on said block connected through said block to said supply system and said return conduits;
   (c) a delivery pump connected to said liquid coupling means connected to said supply system; and
   (d) a suction pump connected to said liquid coupling means connected to said return conduits.
9. An articulated spindle as claimed in claim 7, in which each said return conduit is a withdrawal passage extending axially through a part of the length of said shank.
10. An articulated spindle as claimed in claim 7, in combination with a rolling mill having a pair of driven rolls and a pair of drive shafts, in which
   one said sleeve is drivingly connected with one said drive shaft and
   the other said sleeve is drivingly connected with one said driven roll.

* * * * *